Dec. 10, 1963  B. JEENINGA  3,113,571
DELIVERY OF CALVES AT BIRTH
Filed April 26, 1962
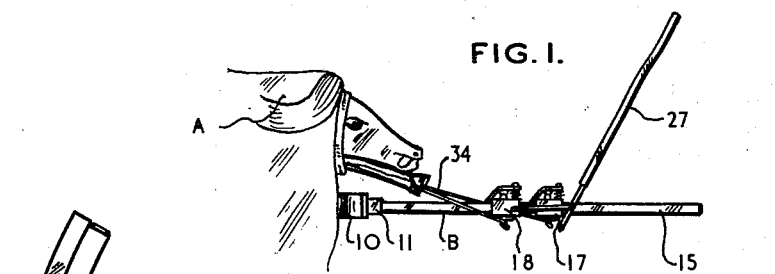
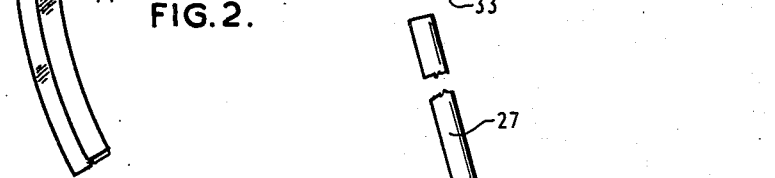
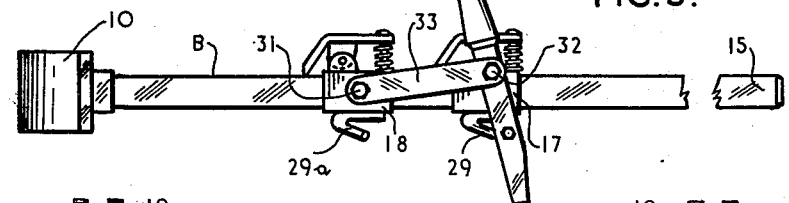
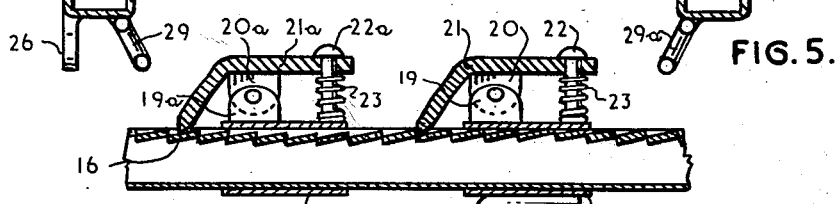
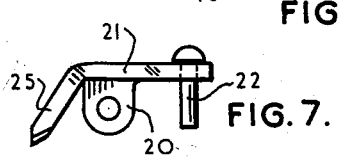
INVENTOR
BOUKE JEENINGA
W. Irwin Haskett
ATTORNEY

United States Patent Office 3,113,571
Patented Dec. 10, 1963

3,113,571
DELIVERY OF CALVES AT BIRTH
Bouke Jeeninga, Grote Buurt 26, Garyp (Fr), Netherlands
Filed Apr. 26, 1962, Ser. No. 190,321
5 Claims. (Cl. 128—352)

This invention deals with the delivery of calves at birth and relates to a parturition veterinary appliance designed for such use generally in animal husbandry.

At the birth of calves, foals and lambs, when the conditions existing at the birth are normal, then the animal being delivered does not encounter any obstacles which are not capable of being overcome naturally, but should conditions arise which are not normal, then it may be necessary to seek the professional aid of a veterinary surgeon or other person having an extensive knowledge of animals and the delivery of their offspring.

Considerable thought has been given to this subject and a mechanical, manually operated device has been constructed to assist in the delivery of young animals without the necessity of having to seek the professional services of a veterinarian.

In this specification I will refer to calves, but it will be understood that the invention is applicable to a much broader use than the delivery of calves, and may also be used with great success in the delivery of foals and lambs.

The objects which had to be attained before success of the problem with which I was confronted was assured, were as follows:

One of the objects of my invention is to construct a veterinary appliance or device which may be readily assembled, set up and operated by a single person, and by means of which delivery of calves, foals, lambs etc. can be expediently carried out with efficiency and without harm to the animal being delivered.

Another object of my invention is to construct my veterinary appliance or device so that it is light and durable and capable of being knocked down so that it will form a compact bundle occupying a minimum of storage space when not in use.

A further object of my invention is to provide an obstetrical flexible member or members such as chains which may be attached to a protruding leg of a calf during birth, and in adjusting my parturition appliance so that a direction pull may be exerted on the leg or legs of the calf to assist in the delivery of the calf.

Still another object of my invention is to assure that the pulling force applied to the protruding leg or legs of the calf will be steady and so graduated that it will not be subject to fluctuations or jerks which might be injurious to the animal under treatment and to the calf being delivered.

Still a further object of my invention is to progressively apply the pulling force on the obstetrical chain so that the movement of the chains will be a step by step movement calculated to give the best results when delivering a calf.

Another object still of my invention is to construct my parturition veterinary appliance with a transverse arcuate member which will engage with the hind legs of a cow being delivered and maintain the legs in the best position to facilitate an easy delivery of the calf.

Still a further object of my invention is to construct my veterinary appliance with a light metal alloy which is comparatively acid resistant and will also resist corrosion.

Further objects of my invention will be made clear as the specification develops.

So that the nature of my invention will be clearly understood, I have illustrated an embodiment of the same which I shall describe in detail, but I wish it to be understood that I do not limit myself to the specific instrument so described but reserve the right to modify the several parts without departing from the spirit of my invention as defined in the appended claims.

In the drawings:

FIGURE 1 is a side elevation of my parturition veterinary appliance when in use to assist the delivery of a calf;

FIGURE 2 is a plan view of my parturition veterinary appliance with the rod or reach broken intermediate of its length;

FIGURE 3 is a side elevation of my parturition veterinary appliance shown in FIGURE 2; and FIGURE 4 is an enlarged fragmentary portion of the reach or rod showing the rack on its upper face and the manner in which the pawls or detents are pivotally mounted on sleeves slidably mounted on the reach or rod;

FIGURE 5 is a transverse section of one of the sleeves illustrated in FIGURE 4, and showing the lugs on which the pawl or detent is pivotally mounted, also the hook chain engaging member welded to the lower face of the sleeve;

FIGURE 6 is a transverse section of a second sleeve which is mounted on the reach or rod showing the lugs on which the pawl or detent is pivotally mounted and on the lower face of the sleeve showing the depending lug to which the hand lever is pivotally connected, also showing the chain engaging hook member welded to the lower face of the sleeve; and FIGURE 7 is a detailed elevation of one of the detents or pawls.

Like characters of reference refer to like parts in the several figures of the drawings.

Referring to the drawings, A represents a portion of the hind end of a cow with my parturition device B positioned in the act of assisting in the delivery of a calf. This device B consists of an arcuate transverse member 10, the outer face of which is of smooth and uninterrupted convex shape, and this convex surface is held in pressing contact with the hind legs of a cow A and tends to hold the legs more spaced apart than is normal. In this manner the pelvic bones of the cow are so positioned to facilitate the birth of the calf being delivered.

From the concave side of the arcuate member 10 a stub pin 11 projects and over this stub pin the one end 12 of the rod or reach 13 fits, and the rod or reach is connected to the pin 11 by the bolt 14.

The rod or reach 13 is provided at the end remote from the pin 11 with a handle 15 which permits of the user of the device holding it in a manner permitting slight movement of the reach or rod 13 so that the pull on the fetus is applied in the manner best calculated to assist in the birth of the calf.

The intermediate portion of the rod or reach 13 is preferably made hollow and square in cross section, and the upper face of the rod or reach 13 between the end 12 and the handle 15 is formed with a rack 16 the formation of which is shown in FIGURES 2 and 4 of the drawings.

Slidably mounted on the rod or reach 13 are a pair of sleeves 17 and 18 which are square in cross section so that these sleeves are only movable in an axial direction but are held against rotational movement.

The sleeves 17 and 18 are with two exceptions very similar to each other, but it may be advisable to describe each sleeve individually. The sleeve 17 is formed in its upper face with a pair of upstanding parallel jaws 19 formed with aligned orifices and these jaws embrace the lug 20 which depends from the under face of the pawl or detent 21 which is provided at its free end with a downwardly disposed pin 22 which is encircled by the spring 23 and this spring engages the under face of the pawl 21 and the upper face of the sleeve 17.

The lug 20 is formed with an orifice, and when the orifices in the jaws 19 and the said lug register, then a pivot pin 24 secures the pawl in pivoted relation with respect to the sleeve 17.

FIGURE 7 of the drawings shows the pawl 21 in profile and it will be seen that it is offset intermediate of its length at 25 and that the lower end of the offset portion of the pawl is bevelled to co-act with the rack 16.

The sleeve 17 is further provided with a lug 26 which depends from the sleeve and lies in the plane of the outer face of the sleeve. This lug is formed with an orifice to permit of the hand lever 27 being pivotally connected to the sleeve 17 by means of the bolt or pivot pin 28.

On the under face of the sleeve 17 and opposite the lug 26 is an angularly disposed hook 29 the open end of which is disposed towards the handle 15 of the rod or reach 13 when the sleeve is mounted on the rod or reach.

The sleeve 18 is formed with a pair of jaws 19ª which co-act with the lug 20ª on the pawl or detent 21ª, and the lug and jaws are connected by a pivot pin 24ª. The pawl or detent 21ª is provided with a downwardly depending pin 22ª on which is mounted a spring 23ª, and these parts of the sleeve 18 are similar to and function in the same manner as their corresponding parts on the sleeve 17.

The sleeve 18 is provided on its lower face with a hook member 29ª but it is angularly disposed on a lateral wall of the sleeve opposite to that carrying the hook 29 on the sleeve 17.

The hooks 29 and 29ª project beyond the lateral walls of the sleeves 17 and 18 which carry these hooks, and the hooks 29 and 29ª are welded to their respective sleeves 17 and 18. In like manner the pins 22 and 22ª are welded to the pawls or detents on which they are mounted.

The sleeve 18 is provided with a threaded orifice 30 in one of its lateral walls, and with this orifice a shoulder pin 31 makes threaded engagement and the lever 27 is former with an orifice (not shown) with which the shoulder pin 32 makes threaded engagement.

The sleeve 18 is connected to the hand lever 27 by a link 33 the ends of which are connected to the shoulder pins 31 and 32. The flexible obstetrical member 34 which may be in the form of a chain is tied intermediate of its length to the protruding forelegs of the calf, and the free ends of the flexible obstetrical member are connected to the hooks 29 and 29ª.

When the device is in use illustrated in FIGURE 1, with the lever 27 rocked clockwise to its rearward position, then the sleeve 17 is anchored by the detent 21 engaging with a tooth of the rack 16, but the sleeve 18 has been moved longitudinally on the reach or rod 13 toward the sleeve 17 until the detent or pawl 21ª has its offset end in contact with the toothed rack 16, as is clearly shown in FIGURE 4.

When the lever 27 is rocked in an anti-clockwise direction the movement of the sleeve 18 is arrested by the pawl 21ª engaging the racked teeth 16, and the sleeve 17 alone is now movable along the rod or reach 13 spacing the sleeve 17 further apart from the sleeve 18 in which position the detent or pawl 21 will contact with a tooth on the rack 16.

Movement of the lever 27 when rocked in a clockwise direction will now hold the sleeve 17 stationary while the sleeve 18 is moved longitudinally along the reach or rod 13. It will thus be seen that the alternate movement of the two sleeves 17 and 18 is intermittent so that the movement of the sleeves along the rod or reach 13 is a step by step movement.

However, during these two movements of the lever 27 the constant pull of the obstetrical chain on the forelegs of the calf will be maintained. This is accounted for by the fact that the hooks 29 and 29ª are engaged to opposite ends of the obstetrical chain which is connected intermediate of its length to the protruding forelegs of the calf, and this explains the anomaly of a constant pull being exerted on the chain while the movement forwardly of the sleeves 17 and 18 is intermittent.

The oscillation of the hand lever controls the speed of delivery of the calf, and this speed of operation can be judged by the person operating the parturition veterinary device.

The device is light in weight, durable in construction, easily transportable and resistant to rust or acid, and is easily handled by a single operator.

What is claimed as new is:

1. A device for engaging the hind legs of a cow to induce the positioning of the pelvis bones to facilitate calving and apply a constant pull on the protruding forelegs of a calf during birth, comprising an arcuate member having a forwardly disposed convex face to engage the hind legs of a cow and a rearwardly disposed concave face, a reach extending rearwardly from the concave face of and in the same plane as the arcuate member, a pair of non-rotatable sleeves slidably mounted on the reach, means for connecting each sleeve to the protruding legs of a calf during birth, a manually operated lever connected to one sleeve, a link connecting the lever with the other sleeve, the sleeves being movable alternately and intermittently along the reach.

2. A device for engaging the hind legs of a cow to induce the positioning of the pelvis bones to facilitate calving and apply a constant pull on the protruding forelegs of a calf during birth, comprising an arcuate member having a forwardly disposed convex face to engage the hind legs of a cow and a rearwardly disposed concave face, a reach of substantially rectangular cross section extending rearwardly from the concave face of and in the same plane as the arcuate member, a pair of sleeves of substantially rectangular cross section slidably mounted on the reach, a rack on the reach, a pawl on each sleeve co-acting with the rack, a manually operated lever connected to one sleeve, a link connecting the lever to the other sleeve and a member connected to the sleeves and the protruding legs of a calf during birth.

3. A device for the delivery of calves at birth comprising an arcuate member having a forwardly disposed smooth and uninterrupted convex face for engagement with the hind legs of a cow to induce positioning of the pelvis bones to facilitate calving and a rearward concave face, a reach of substantially rectangular cross section extending rearwardly from the concave face of the arcuate member, said reach and said arcuate member being in the same plane, a pair of sleeves of substantially rectangular cross section slidably mounted on the reach, a rack on the reach, a pawl on each sleeve co-acting with the rack, a flexible member connected intermediate of its length to the protruding legs of a calf during birth, the ends of the flexible member being connected to the two sleeves respectively, and a manually operated lever co-acting with the pawls.

4. The device claimed in claim 2 in which hooks are disposed on opposite sides of the two sleeves, one of the sleeves being provided with a depending lug on the side of the sleeve opposite the hook.

5. The device claimed in claim 2 in which each sleeve is formed with a pair of upstanding parallel jaws and the pawl on each sleeve being provided with a depending lug embraced by the said jaws and pivotally attached thereto, and resilient means between the pawls and sleeves.

References Cited in the file of this patent

UNITED STATES PATENTS

| | | |
|---|---|---|
| 1,604,714 | Nuesch | Oct. 26, 1926 |
| 2,654,368 | Matteson | Oct. 6, 1953 |
| 2,692,600 | Curyea | Oct. 26, 1954 |
| 2,774,353 | Quist | Dec. 18, 1956 |
| 2,791,219 | Bowie | May 7, 1957 |

FOREIGN PATENTS

| | | |
|---|---|---|
| 175,310 | Germany | Aug. 21, 1906 |